United States Patent Office.

JOHN HOELCK, OF CHICAGO, ILLINOIS.

PROCESS OF RAPID TANNING.

SPECIFICATION forming part of Letters Patent No. 389,150, dated September 4, 1888.

Application filed October 29, 1887. Serial No. 253,734. (No specimens.)

*To all whom it may concern:*

Be it known that I, JOHN HOELCK, of Chicago, Illinois, have invented certain new and useful Improvements in Processes of Treating Hides and Skins, of which the following is a specification.

Prior to my invention the quality of the leather produced has always suffered by any attempts to accelerate the operation or reduce the expense of preparing it.

The object of my invention is to accelerate the operation and to reduce the cost of manufacture, and at the same time produce a leather of superior quality to any tanned leather or rawhide now on the market.

To these ends I treat the hides as follows: I take the salted hides, heavy or light, and put them into a vat of fresh water, where they may remain over night. I then flesh them and wash them in a wash-wheel to remove the salt and again put them into a vat of clean fresh water. They may remain in this vat over night. I then tie the hides together, head to butt, though when intended for belting the heads and bellies may be cut off and prepared for sole-leather, and put them into a lime-vat, and, by means of reels and chain belts handle them from one lime-vat to another for about eight hours. I then transfer them to warm-water vats and treat them for about six or eight hours with water at a temperature of about 80° Fahrenheit, handling them from one vat to another. The hides are then allowed to remain in warm water of about 80° for a time—say over night—after which the hair can be readily removed. When unhaired, which may be done in the usual manner, the hides are washed in clean water and freed from lime by the working incident to unhairing or short-hairing. Being thus freed from lime by working on the grain side and short-hairing, they are worked on the flesh side, fleshed or shaved. When cleaned and shaved, the hides are put into clean cold water for a time—say over night—to swell them, though this is not absolutely necessary, and then into a coloring-wheel with a liquor of about twenty per cent. cutch or catechu. I use enough of this liquor to cover the hides and produce an even color. I then add to this liquor about thirty pounds of common salt for every thirty hides under treatment, and keep the wheel in operation for about four hours to insure the hides being evenly colored. I then mix with the liquor substantially three pounds of alum, one pound of salt, one twenty-fourth pound of borax, and one-half pound of flour (preferably rye-flour) to each hide under treatment, and use enough of this liquor to keep the hides covered, and leave them in it for, say, from two to four days, and handle them with the wheel for two or three hours each day. I then renew the liquor twice or three times, according to the weight of the hides, and handle them until sufficiently tanned. The hides are then hung up to dry in a drying-loft, and when thoroughly dry they are dampened in a vat of catechu at a temperature of about 60° Fahrenheit, containing from twenty to thirty per cent. of catechu. The hides now may be put in a stuffing-wheel for about an hour, then taken out and oiled with neat's-foot oil on the grain side, and then put back into the stuffing-wheel for about an hour. They are now in suitable condition for glove-leather and similar uses; or they may be stuffed with a stuffing made from tallow and wood-tar, composed substantially of one hundred pounds of tallow and twenty pounds of wood-tar boiled and skimmed till they unite, and kept working in the wheel until dry. They may then be worked on a thumper or over a beam to be well stretched out. The leather may now be finished for either belting or lacing. It may be cut up, dampened, and shaved, stuffed again with tallow and tar, and also neat's-foot oil, when desired, in a stuffing-wheel while still damp for about an hour, and then dried for lace-leather; or it may be dampened, if too dry, in liquor, (same as before,) stuffed again and set out on a table and cut up and stretched for belting; or it may be treated to make harness-leather, being blackened before oiling, and otherwise treated the same as for lace-leather. Other kinds of leather may be finished in the usual way.

Instead of stuffing the hides, they may, after being dampened with catechu to fill them with tannin, be treated with a tanning-liquor to set the catechu, as in the ordinary process of tanning, to make sole and similar leather. When finished in this way, I prefer to use a somewhat stronger liquor for filling, say one containing sixty per cent. of catechu.

It is of course understood that many modifications may be made in this process without departing from my invention, and that equivalent steps may be substituted for some of the steps which I have specified; also, that where I have described the hides as being treated or handled by machinery known in the art, equivalent machinery or hand treatment may be used instead of the machines and operations which I have specified.

What I claim is—

1. The herein-described process in rapid tanning, consisting in unhairing the hides, swelling them, treating them with catechu and common salt, treating them with a mixture containing alum, salt, borax, and flour, drying them, and dampening them with catechu.

2. The herein-described process for the rapid tanning of hides, consisting in unhairing them, swelling them, subjecting them to the action of catechu and common salt, subjecting them to the action of a mixture containing alum, salt, borax, and flour, drying them, dampening them with catechu liquor, and stuffing them with a stuffing of tallow and wood-tar.

JOHN HOELCK.

Witnesses:
ALBERT H. ADAMS,
WM. S. BATES.